Feb. 21, 1928.
W. E. BEADLE
1,660,149
BATCH MEASURING DEVICE
Filed Feb. 6, 1922   2 Sheets-Sheet 1
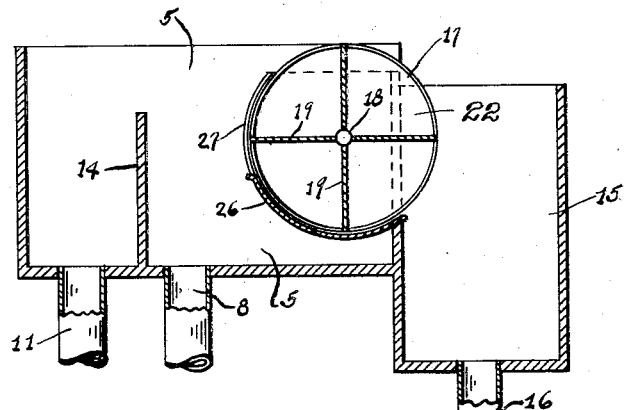
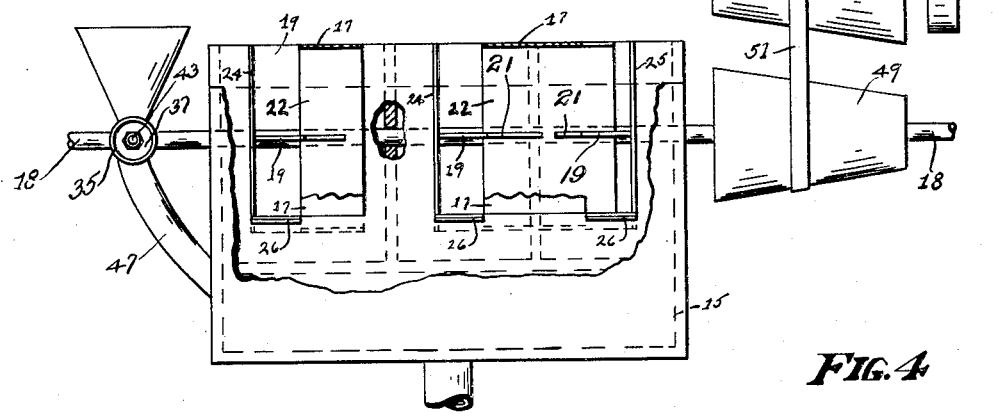
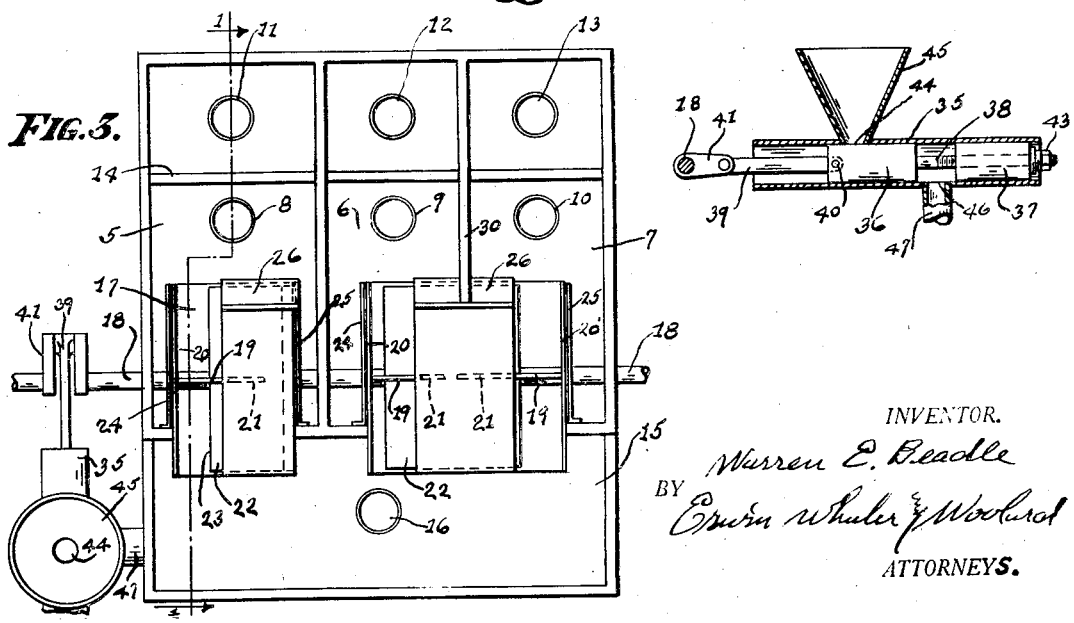
INVENTOR.
Warren E. Beadle
BY
ATTORNEYS.

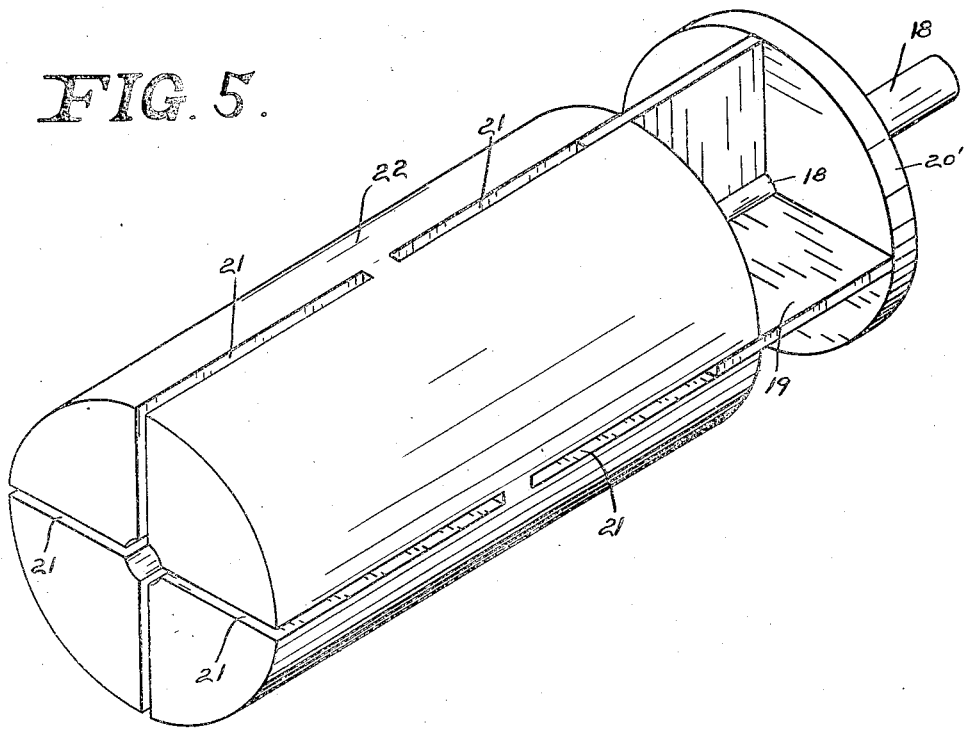

Patented Feb. 21, 1928.

1,660,149

UNITED STATES PATENT OFFICE.

WARREN E. BEADLE, OF WISCONSIN RAPIDS, WISCONSIN.

BATCH-MEASURING DEVICE.

Application filed February 6, 1922. Serial No. 534,457.

This invention relates to improvements in batch measuring devices.

It is the object of this invention to provide novel and effective means for accurately measuring in any desired proportions a number of different liquids or powdered solids which are to be mixed together to form a single batch, the relative proportions of the several ingredients being variable and the rate of delivery of the measuring device being also variable.

Certain devices have been used heretofore for the purpose of measuring liquids in a continuous operation, but certain difficulties have been experienced in the use of all such devices. For example, there has not, so far as I am aware, ever been designed any device in which the rate of delivery or output of each unit of the whole batch measuring system could be varied simultaneously while preserving the relative proportions of all the ingredients. It has also been impossible in any measuring device with which I am acquainted to measure simultaneously and deliver to a mixing receptacle a plurality of ingredients which include both solids and liquids.

In the drawings:

Fig. 1 is a vertical section taken on line 1—1 of Fig. 3 and illustrating a rotary measuring valve for liquids which partially embodies my invention.

Fig. 2 is a front elevation of a complete measuring device comprising one embodiment of this invention.

Fig. 3 is a plan view of the same.

Fig. 4 is a detail of that part of the measuring device which is used for the measuring of solids.

Figure 5 is an isometric view of a portion of a rotary transfer device showing one set of its blades and the adjustable wall or drum.

Like parts are identified by the same reference characters throughout the several views.

This invention contemplates the use of a series of chambers 5, 6, and 7 which communicate through pipes 8, 9 and 10, respectively, with sources of supply of different liquid ingredients which are to be measured and mixed together to form a complete batch having the required characteristics. The pipes 11, 12 and 13 return the surplus liquid delivered to the chambers 5, 6 and 7 to the original sources of supply of such liquids. The partitions 14 at the back of each of the chambers 5, 6 and 7 serve to determine the height of liquid in such chambers. The device thus far described is well known in the art as a means for providing liquid at a constant level. It will be understood that when a quantity of liquid is pumped through the pipes 8, 9 or 10 into the chambers 5, 6 and 7, it will be maintained at a height in such chambers equal to the height of the partitions 14 and the surplus will flow over the partitions and will be delivered by gravity through the return pipes 11, 12 and 13 back to the vats or containers from which the several liquids were originally drawn.

A mixing chamber 15 is disposed across the front of each of the constant level chambers 5, 6 and 7. Into the receptacle or trough 15 are dumped the ingredients from each of the several measuring devices and the mixture thus produced is delivered through the pipe 16 for use.

In the partition wall between chamber 5 and the mixing chamber 15, there is mounted a measuring device which may be designated in its entirety by the numeral 17. This device comprises a wheel mounted upon a shaft 18. A plurality of axial blades 19 are carried by the shaft and are maintained in position by an end piece or disk 20. The free ends of each blade 19 are received into slots 21 formed in an axially movable drum 22. The inner face 23 of this drum constitutes a movable end wall for each of the several sector-shaped compartments lying between the radial blades 19. Obviously the movement of the drum 23 will result in varying the capacity of each of the aforesaid compartments.

That portion of the wheel 17 which lies within chamber 5 is partially enclosed by a housing which includes end walls 24 and 25 and a cylindrical connecting wall 26 which fits closely to the periphery of the wheel, but is cut away at 27 for an axial distance equal to the greatest axial measurment of the variable compartments lying between the blades 19. The drum 22, when fully extended, is enclosed by the cylindrical wall 26 and the end wall 25. When this drum has been moved axially to the left in Fig. 3 to minimize the capacity of the measuring compartments, it will still be partially enclosed within the casing, thereby preventing the escape of liquid from chamber 5 around the end of the movable drum.

The peripheral length of that portion of the wall 26 which lies beneath the wheel 17 and beneath the opening 27 must be at least equal to the peripheral distance between two consecutive blades 19 of the wheel in order to prevent the escape of any considerable quantity of unmetered liquid through the device. The opening 27 will, nevertheless, extend for a considerable distance below the top of partition 14 in order that each of the compartments of the measuring wheel may have ample opportunity to become filled with liquid during the rotation of the wheel. It will be obvious that if the wheel 17 be rotated counter clockwise as viewed in Fig. 1, each of the compartments enclosed between the movable drum 23, the end wall 20 of the wheel, the cylindrical casing 26, and two radial blades 19 will in turn become filled with the liquid in chamber 5, and will, by the continued rotation of the wheel, deliver such liquid to the mixing chamber 15.

It will be noted that the shaft 18 extends across each of the several chambers 5, 6 and 7. A single measuring device 17 serves both of the chambers 6 and 7. This device has disk-like walls 20 and 20'. The drum 22 in this device is provided with recesses 21 in each of its end faces, these recesses, being adapted to receive the radial partitions 19 as in the device previously described. This measuring wheel is provided with a casing made up of cylindrical wall 26 and end walls 24 and 25. The partition 30 between chambers 6 and 7 is fast to the intermediate portion of cylindrical wall 26 and prevents the intermingling of liquids from chambers 6 and 7.

It will be obvious that the measuring device used in connection with chambers 6 and 7 can only be employed for the purpose of controlling the relative proportions of liquids of such a nature that it is desirable at times to vary their proportions in inverse ratio. It will be seen that when the drum 22 is moved axially through the measuring wheel, the compartments at one end thereof will be reduced in size while the compartments at its other end will be simultaneously and proportionately increased. Where it is not desired to vary in inverse proportion the quantities of two or more liquids, it will be necessary to employ additional measuring devices similar to that first described in connection with chamber 5.

For the purpose of measuring solids, and, particularly, pulverized solids, I prefer to use a different type of metering device. This device is illustrated separately in Fig. 4 and it is desired to call attention to the fact that it is not only suitable for the measuring of solids, but may also be employed to advantage for measuring liquids where great accuracy is desired.

The device shown in Fig. 4 comprises a cylinder 35 within which a duplex piston made up of separate piston units 36 and 37 connected by a threaded bolt 38 is operable. A connecting rod 39 is pivoted to the piston unit 36 at 40 and is connected at its other end through a crank 41 upon the shaft 18. The capacity of the measuring device can be varied by turning the piston unit 37 upon the threaded bolts 38, thereby moving the piston unit 37 to or from unit 36. A lock-nut 43 upon the projecting end of bolt 38 serves to maintain the device in any desired adjustment. The cylinder 35 is provided with an inlet port 44 fed by a hopper 45, and at a point axially removed from port 44 there is provided an outlet port 46 in the lower side of the cylinder wall. A tube or duct 47 leads from port 46 into the mixing trough 15. It will be understood that solids or liquids may be supplied in any desired manner to the port 44 and in the course of the reciprocation of the piston units 36 and 37, a given quantity of material will be received between said units through port 44, and will be delivered therefrom through port 46 whence it will be conveyed to the common mixing trough 15.

It must be obvious from the foregoing that for each revolution of the shaft 18, there will be a predetermined amount of material delivered into the mixing trough 15 from each of the several containers 45, 5, 6 and 7. It must also be obvious that the proportionate amount of each material used in the batch can be varied at will. If measuring devices similar to that shown in chamber 5 are used throughout, it will be possible to vary each ingredient of the batch independently of every other ingredient. If, however, a measuring device similar to that used conjointly in chambers 6 and 7 is employed, it will be impossible to vary the amount of one ingredient without increasing in inverse proportion the amount of some other ingredient to be supplied to the batch.

When the correct proportions of ingredients for any desired batch have been once ascertained, these proportions can be left unchanged and the batch can then be continuously mixed as desired. It will be found possible by any speed changing mechanism interposed in the driving connections for shaft 18 to mix the batch at any desired rate, while preserving the exact proportions of each of the several ingredients. Such a speed changing device is shown in Fig. 2 where frusto conical pulleys are shown at 49 and 50. These pulleys are connected by a belt 51 which is shiftable axially in a well known manner to vary the speed of shaft 18 relative to that of shaft 52 which is assumed to be driven from any source of power at a substantially constant speed. It will not be understood from the foregoing that this invention is limited to the precise form of mechanism shown. On the contrary, the chambers 6 and 7 may each be provided with a measuring wheel 17 similar to that shown in Fig. 5. It is also possible within the scope of this invention to provide a series of measuring devices such as are shown in Fig. 4 for the purpose of handling all the materials to be used in the batch.

I claim:

1. In a device of the character described, the combination with supply and receiving chambers, of a plurality of variable capacity transfer devices each adapted to receive its capacity of material periodically from a supply chamber and to deliver such material to a receiving chamber, and synchronized variable speed driving connections in operative driving relation to said devices, whereby the rate of delivery of material may be varied without affecting the relative proportions of such material received from the several devices.

2. In a device of the character described, the combination with a receiving chamber, of a plurality of variable capacity delivery devices each periodically operable to deliver its capacity of material to said chamber, a single driving means for said devices, and variable speed mechanism operative to drive said means at a plurality of speeds whereby to vary the rate of delivery of material without affecting the relative proportions delivered by the several devices.

3. In a device of the character described, the combination of a plurality of delivery devices interconnected for simultaneous operation at variable speeds, and means for adjusting the capacity of one of said devices.

4. In a metering device, a receiving container, a plurality of sources of supply of different ingredients to be mixed in said container, a single horizontal shaft, a metering device associated with each source of supply and operable by the rotation of said shaft, means for varying independently the rate of delivery of ingredients through one of the metering devices, and means for varying the rate of rotation of said shaft.

5. In a batch measuring device, a plurality of ingredient supplying receptacles, an ingredient receiving receptacle, measuring apparatus for receiving a determinable quantity of ingredients from the supplying receptacles and delivering said ingredients to the receiving receptacle, adjustable mechanism for varying the proportion of ingredients received by the measuring apparatus from the supplying receptacles, and variable speed driving mechanism operatively connected with said apparatus for controlling the total amount of ingredients to be supplied in a given time while preserving the respective proportions of the ingredients.

6. In a device of the character described, the combination with a pair of adjacent supply compartments having an intermediate partition wall, of a common receiving compartment, a shaft extending transversely between said receiving compartment and said supply compartments, axially extending radial blades mounted on said shaft in sets to rotate respectively through said supply compartments, said sets of blades being spaced from each other upon either side of said partition wall, a cylindrical body axially adjustable upon said shaft between said sets of blades, said body being provided with axially extending slots adapted to receive said blades, and an arcuately extending apron fitting about said body and extending about each of said sets of blades, said apron being connected with said partition wall and being adapted to permit of the axial adjustment of said body to vary inversely the capacities of spaces between the blades of said sets, said partition wall being fixed.

7. In a batch measuring device, a rotor comprising a shaft, two sets of radial blades extending axially thereof, and a drum provided with slots for the blades of each set, said slots being of a length such as to permit of the axial adjustment of the drum, whereby to vary the capacities of chambers defined by said blades.

WARREN E. BEADLE.